United States Patent [19]
Urano

[11] 3,866,795
[45] Feb. 18, 1975

[54] VENDING MACHINE HAVING HEATING AND COOLING CHAMBERS

[75] Inventor: Hitomi Urano, Tokyo, Japan

[73] Assignee: Hoshizaki Electric Co., Ltd., Toyoake, Aichi Prefecture, Japan

[22] Filed: Nov. 10, 1972

[21] Appl. No.: 305,477

[30] Foreign Application Priority Data
July 1, 1972  Japan.............................. 47-66264

[52] U.S. Cl............................................ 221/150 HC
[51] Int. Cl............................................. B65g 59/06
[58] Field of Search ..... 221/150 HC, 150 A, 150 B; 99/357, 443

[56] References Cited
UNITED STATES PATENTS
3,620,341   11/1971   Gardner................... 221/150 HC X
3,653,541   4/1972   Crum.......................... 221/150 HC FOREIGN PATENTS OR APPLICATIONS
60,078   8/1942   Denmark...................... 221/150 HC

*Primary Examiner*—Stanley H. Tollberg

[57] ABSTRACT

A vending machine for selling hot foods which includes a cold storage and a heating chamber. The cold storage comprises a number of vertical containers having two or more channels for storing food products of the same or differ kinds, a feed arrangement being provided for supplying food products from the respective channels to the heating chamber under control of a coin operated device. After heating in the heating chamber the food product is discharged in consumable form.

3 Claims, 6 Drawing Figures

VENDING MACHINE HAVING HEATING AND COOLING CHAMBERS

BACKGROUND OF THE INVENTION

This invention pertains to vending machines and more particularly to vending machines having cold storage provision for storing food in cold state prepatory to supply to a heating chamber for quick heating of a food product therein prior to discharge from the machine to the customer.

Machines of this type have been developed for vending hot foods such, for example, as hotcakes; i.e., popovers and the like. Such foods usually require comparatively light refrigeration and accordingly may be warmed by a low-rated heat source. Uncooked or semicooked foods, particularly raw meat or fish, require however greater refrigeration to protect against contamination and hence an efficient heat source of high caloric power is required not only to thaw out the "frozen" food but also to cook it to an edible state in a relatively short period of time. Preferably, an electronic range is used as the heat source for fast and uniform cooking.

In the illustrated embodiment of the invention, the vending machine comprises a cold storage and a heating chamber. Generally, the cold storage chamber is provided with compartment means for accommodating food products of the same or different kinds. A feed cam is arranged to feed a selected food item to the heating chamber.

More specifically, I provide in accordance with the invention, a vending machine comprising a cold storage chamber, a heating chamber contiguous to said cold storage chamber and being heat insulatingly separated therefrom, said cold storage chamber being provided with food compartment means for accommodating food products therein, feed cam means in said cold storage chamber and mounted in operative relation to said compartment means for permitting discharge of at least one food product therefrom under control of a customer applied coin, and conduit means extending between said feed cam means in the cold storage chamber and said heating chamber for supply to the latter of the food product discharged from said compartment means, said heating chamber including an electronic heating means constituted of a fixed casing and a movable container disposed in relation to said conduit means to receive the food product discharged from said compartment for movement with the container into the fixed casing for heating therein, said container being adapted for removal from said casing after heating said product for discharge through an outlet of the machine.

Objects and advantages of the invention will be apparent from the following disclosure in conjunction with the accompanying drawings.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
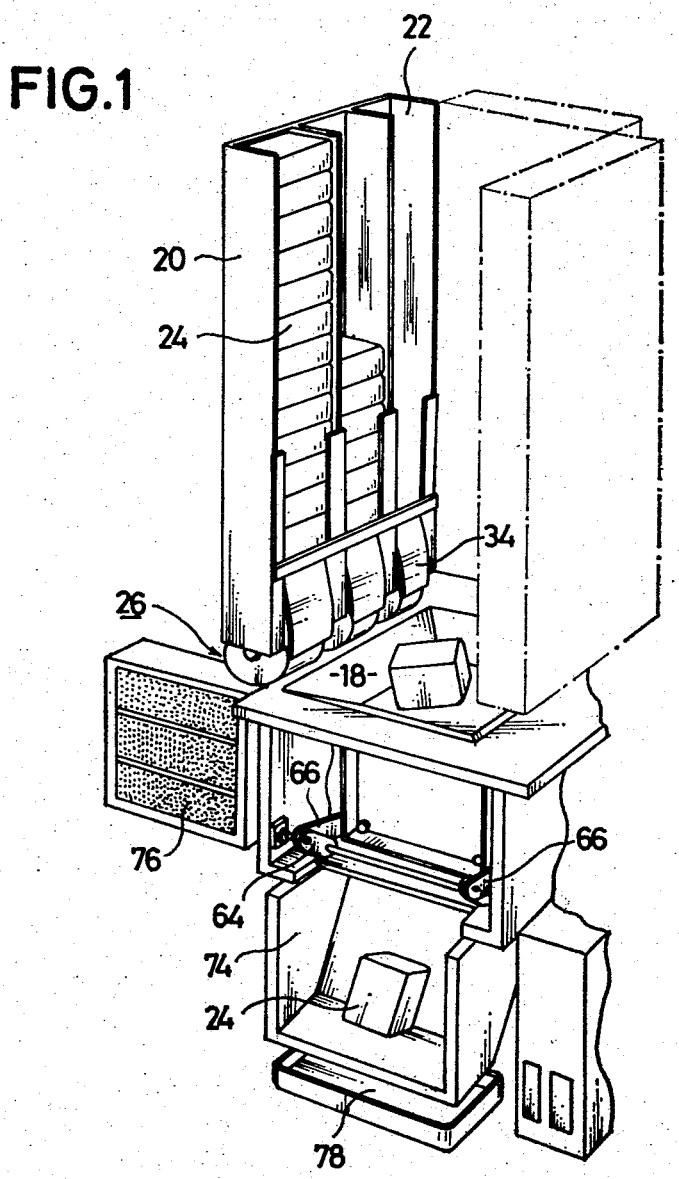
FIG. 1 is a fragmentary perspective view of the vending machine of the invention, the heating chamber of which has been omitted for purpose of clarity.

Referring now to the drawings, the reference numeral 10 denotes the housing of the vending machine. The machine is provided with a cold storage chamber 12 which is thermally insulated from the atmosphere and from a heating chamber 16 beneath the cold storage chamber 12, by a heat insulator 14. A funnel chute 18 interconnects the heating chamber and the cold storage chamber for a purpose hereinafter more fully described.

For purpose of disclosure, the cold storage chamber is provided with three vertical containers 20 arranged in relation to one another as shown in FIG. 1. The individual containers 20 may be provided with as many channels as desired; three vertical channels 22 being illustrated for accommodating numerous items of food 24, such as hamburger or steak patties. The number and shape of the channels 22 may be changed in accordance with size and shape of the food item stored.

A feed cam system 26 is associated with each channel at its lower end for intermittently delivering a selected food item to the funnel shaped chute 18 when discharged from channel 22.

The feed cam for each channel comprises a substantially cylindrical cam 28 having a recess 30 defined by walls at approximately right angles to each other, a shaft 32 centrally mounted in the cylindrical cam 28 and a leaf spring 34 (see FIG. 1) provided forwardly of the recess 30 for preventing the food product 24 from normally being released from vertical channel 22. The food product is normally received in recess 30 of cam 28 which, when operated as hereinafter described, releases during its rotation the food product from its recess, when clearing spring 34, for entry into the chute 18. For this purpose, the shaft 32 is connected to a suitable rotating drive means through a clutch mechanism (both not shown) and rendering operative thereby upon depositing in the machine one or more coins and by actuating a button associated with the desired foot item, all as well known to those skilled in the art.

Figure 2:
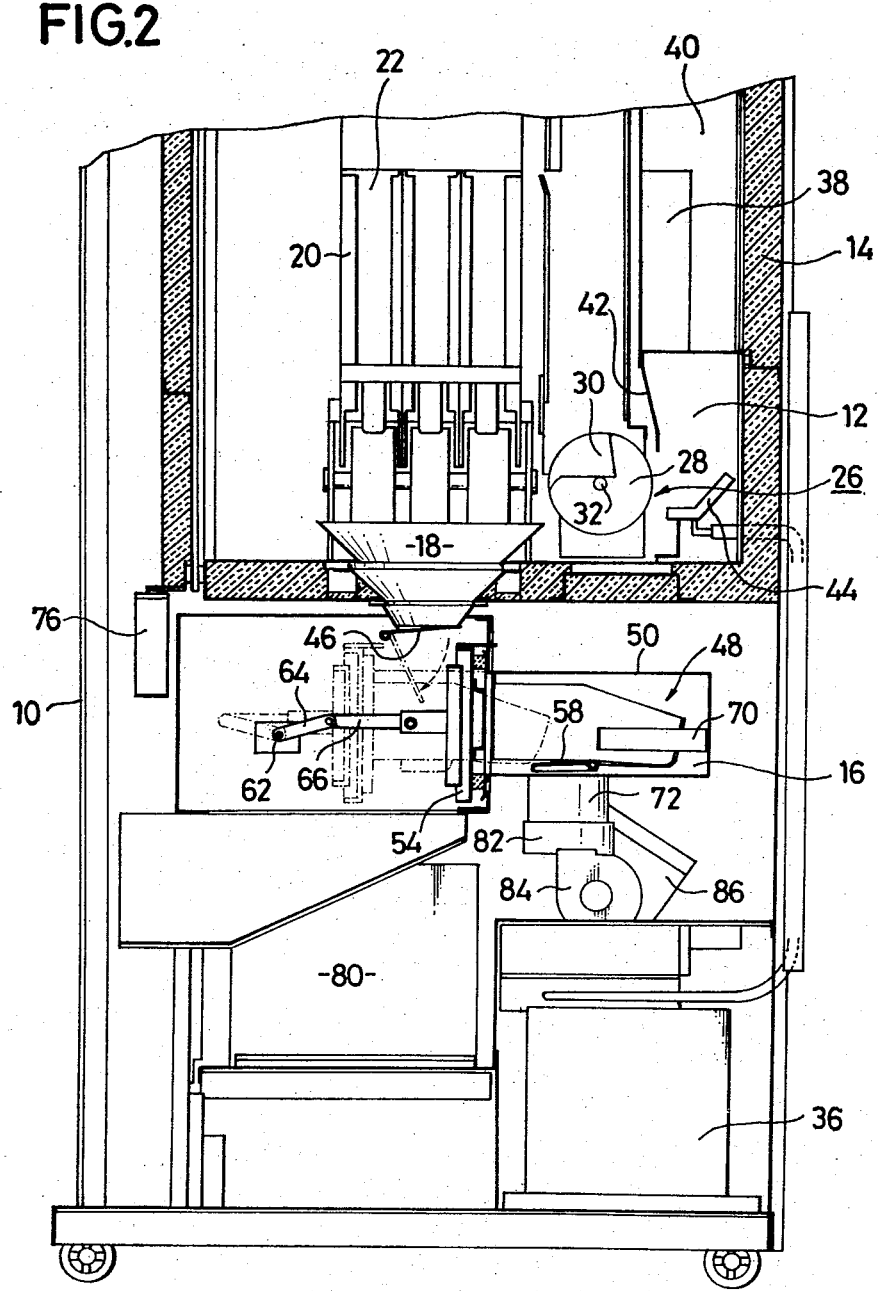
FIG. 2 is a fragmentary, transverse, sectional view of the vending machine shown in FIG. 1 and includes a showing of the heating chambers.

It will be appreciated that when a food item has been released from recess 30, the next food item in the series will fall under its own weight into the recess when cam 28 is again positioned as shown in FIG. 2.

The temperature in the cold storage chamber may automatically be controlled by a thermostat, variations in the temperature being effective to switch a refrigerator unit 40 on and off to maintain the temperature therein within predetermined limits.

The cold air in the chamber 12 is preferably circulated by a suitable fan (not shown). Also, the chamber 12 may be subjected to periodic defrosting by means of an evaporator 38. A water guide plate 42 is associated with the refrigerating unit to direct condensate to a water pan 44.

The bottom port of the funnel chute 18 is closed by a pivotally mounted bearer plate 46 adapted for opening about its pivot under the weight of an engaging food item passing through chute 18. Upon so moving the bearer plate, the food item 24 passes through the bottom port in the funnel into the heating chamber 16 containing an electronic range unit 48.

In FIGS. 2 to 6, the electronic range unit 48 is comprised of a stationary casing 50, and a movable container 52 providing a unit closure wall 54, a fixed bottom 56 and a movable bottom 58 pivoted to a shaft 60 supported by the container 52. The movable container 52 reciprocates into and out of the stationary casing 50; see FIGS. 3 to 6. The container 52 is reciprocatingly moved upon applying thereto of suitably directed forces by means of, for example, a geared motor (not shown) which rotates as shaft 62 connected to a crank 64 linked to a connecting rod 66 connected to the unit closure wall 54. Upon rotation of the shaft 62, the connecting rod 66 will reciprocate and effect thereby inward and outward movement of the container in relation to casing 50.

Figure 3:
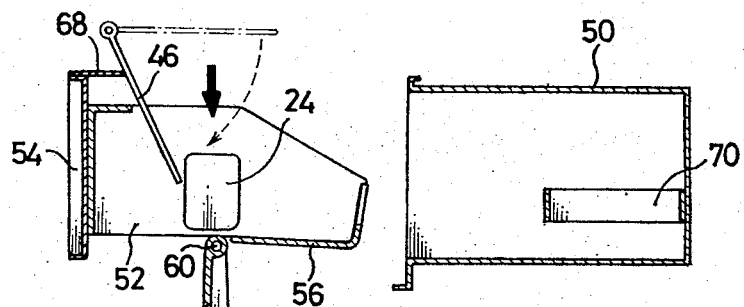
FIG. 3 is a pictorial lateral view of the heating chamber with the stationary casing and movable container in separated condition.
Figure 4:
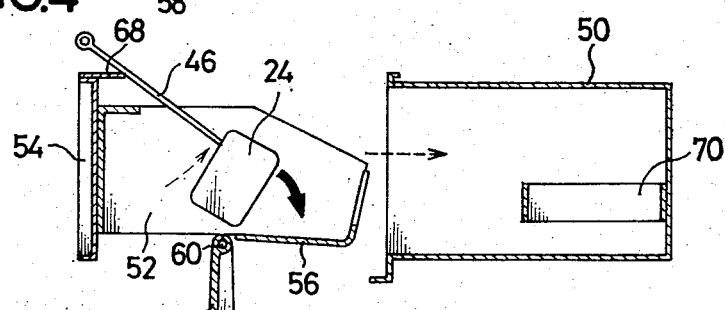
FIG. 4 is a pictorial lateral view similar to FIG. 3 with the movable container however illustrated partly moved to its operative position relative to the stationary casing.

The closure wall 54 at its top end is provided with a projection 68 extending horizontally toward the stationary casing 50. With the movable container 52 located in the position shown in FIG. 3 in relation to the stationary casing 50, the container 52 will be positioned beneath the port in the funnel chute 18 so that when the food item 24 passes through the funnel chute 18, it will strike the bearer plate for downwardly pivoting the same to expose the funnel port. The downward movement of the bearer plate 46 is however impeded by the projection 68 whereby the bearer plate 46 will be inclined as shown in FIG. 3 and the foot item 24 will be guided thereby to a position somewhat above the shaft 60 to prevent accidental discharge of the food product through the open bottom of the container 52. Accidental discharge is prevented because the axial space between the bottom tip of bearer plate 46 and shaft 60 is smaller than the size of the food product.

As is apparent from FIG. 3, if the food product 24, on striking the bottom container 52 is upstanding, the food product will be tipped by bearer plate 46 as it is urged upwardly by the camming action afforded by projection 68 during movement of container 52 toward casing 50. Accordingly, the food product cannot pass through the movable bottom 58 of container 52 without being preheated.

Figure 5:
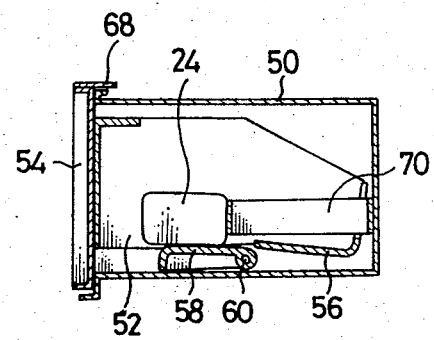
FIG. 5 is a transverse sectional view of the heating chamber wherein the movable container is in fully operative position relative to the stationary casing.
Figure 6:
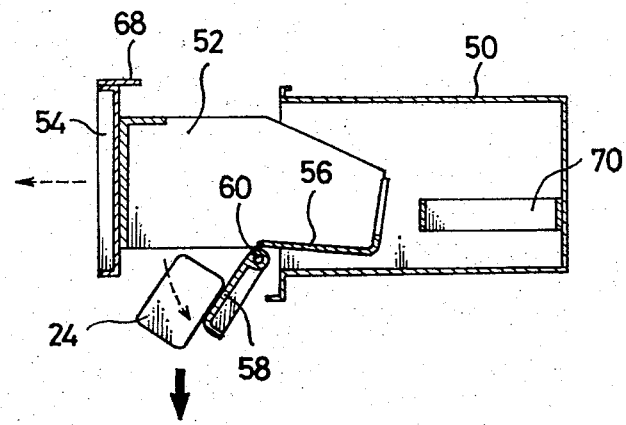
FIG. 6 is a pictorial, transverse sectional view of the heating chamber wherein the movable container has been returned to its original separated position in relation to the casing.

When the container 52 is moved into the stationary casing 50, the turntable 58 is automatically raised by engagement thereof with a downwardly directed L shaped projection on the bottom wall of casing 50. In the course of movement of container 52 within casing 50, bottom 58 is raised sufficiently to permit entry of the container therewith into casing 52 (see FIG. 5), with bottom 58 in substantial alignment with the fixed bottom 56 which is in sliding engagement with the bottom plate of the stationary casing. During entry of the container 52 into casing 50, the food product will strike a barrier 70 projecting inwardly and in horizontal direction from the side wall of the stationary casing 50 whereby the food product 24 is positioned on the movable bottom 58 as shown in FIG. 5. In this position, the food 24 is subjected to microwave oscillations on the order of 2,450 MHz generated by, for example, high frequency oscillations; i.e., produced by a klystron or a magnetron 72 for approximately 50 seconds to obtain optimum heating of the food product.

After termination of the desired heating, the container 52 is returned to its position shown in FIG. 3 by shaft 62, crank 64 and rod 66. The movable bottom 58 will drop under its own weight when the container is withdrawn from the casing thereby providing an opening through which the cooked food product can pass toward an outlet 74 to the consumer (see FIG. 6).

It will be appreciated that processing of the food product is commenced under coin control. Thus, upon supplying the necessary coins to the machine, operation of the cam feed system is commenced to release, from a push-button selected channel, a food product for passage into the feed chute which, at this stage, has the container 52 of the electronic range unit positioned therebelow. The food product, upon striking plate 46, moves the plate to the inclined position shown in FIG. 3. The food product then enters container 52 which is moved toward casing 50 by a suitable motor drive acting through shaft 62, crank 64 and rod 66. The motor drive and the high frequency generator are rendered operative by a time controlled mechanism which synchronizes the various operations so that they occur in the described sequence.

Since time control mechanisms for controlling the sequence and synchronization of sequential operations during an operational cycle are well known, a more detailed disclosure is deemed unnecessary.

In FIGS. 1 and 2, the reference numeral 76 designates a filter for removing the dust contained in the circulating air, 78 a pan for collecting water from defrost, 80 a high voltage power source, 82 a blower duct, 84 a blower and 86 an air duct.

As will be seen from the foregoing disclosure, the invention provides, for sanitary cold storage conditions, a rapid and effective heating of refrigerated food by means of an efficient and uncomplicated structure.

I claim:

1. A vending machine comprising a cold storage chamber, a heating chamber contiguous to said cold storage chamber and being heat insulatingly separated therefrom, said cold storage chamber being provided with food compartment means for accommodating food products therein, feed cam means in said cold storage chamber and mounted in operative relation to said compartment means for permitting discharge of at least one food product under control of a customer applied coin, and conduit means extending between said feed cam means in the cold storage chamber and said heating chamber for supply to the latter of the food product discharged from said compartment means, said heating chamber including an electronic heating means including a fixed casing and a movable container disposed in relation to said conduit means to receive the food product discharged from said compartment means for movement with the container into the fixed casing for heating therein, said container being adapted for removal from said casing after said heating of said product and for automatic discharge of the product from the container as a function of container removal from said casing.

2. A vending machine according to claim 1, wherein the container is reciprocatingly movable under action of a shaft, a crank and a rod operatively connected to a fixed rear wall of the container forming a closure wall for said casing with said container positioned therein.

3. A vending machine according to claim 1, wherein the feed cam system comprises a substantially cylindrical cam which is provided with a recess for selectively feeding the food product upon rotation of the cam, a shaft passing through the center of the cylindrical cam and a leaf spring disposed in front of the recess for preventing the food product from being released from said compartment means.

* * * * *